(12) United States Patent
Jimenez et al.

(10) Patent No.: US 8,457,794 B2
(45) Date of Patent: Jun. 4, 2013

(54) MULTI-SEGMENT LINEARIZATION OF MICRO-ACTUATOR TRANSFER FUNCTIONS

(75) Inventors: Christian Jimenez, Valencia (ES); Eoin English, Dromkeen (IE); José Ibañez-Climent, Massalfasar (ES); Javier Calpe-Maravilla, Algemesi (ES)

(73) Assignee: Analog Devices, Inc., Norwood, MA (US)

( * ) Notice: Subject to any disclaimer, the term of this patent is extended or adjusted under 35 U.S.C. 154(b) by 501 days.

(21) Appl. No.: 12/645,047

(22) Filed: Dec. 22, 2009

(65) Prior Publication Data

US 2011/0054695 A1    Mar. 3, 2011

Related U.S. Application Data

(60) Provisional application No. 61/236,713, filed on Aug. 25, 2009.

(51) Int. Cl.
*G01M 1/38*    (2006.01)
*G01D 18/00*   (2006.01)
*G08C 19/16*   (2006.01)
*G08B 21/00*   (2006.01)
*G11B 5/56*    (2006.01)

(52) U.S. Cl.
USPC ..... 700/275; 702/86; 340/870.05; 340/686.1; 341/118; 341/140; 360/294.4

(58) Field of Classification Search
USPC ............. 700/275; 702/86; 340/870.05, 686.1; 341/118, 140; 360/294.4
See application file for complete search history.

(56) References Cited

U.S. PATENT DOCUMENTS

| | | | | |
|---|---|---|---|---|
| 3,662,163 A | * | 5/1972 | Miller et al. | 708/270 |
| 3,699,318 A | * | 10/1972 | Underkoffler et al. | 708/274 |
| 3,939,459 A | * | 2/1976 | Hoopes | 341/140 |
| 4,282,578 A | * | 8/1981 | Payne et al. | 702/86 |
| 5,270,664 A | | 12/1993 | McMurtry et al. | |
| 5,519,647 A | * | 5/1996 | DeVille | 708/276 |
| 7,639,232 B2 | | 12/2009 | Grant et al. | |

(Continued)

FOREIGN PATENT DOCUMENTS

EP    1 760 882    3/2007

OTHER PUBLICATIONS

Uni, Study on Open-Loop Precision Positioning Control of a Micro-positioning Platform Using a Piezoelectric Actuator, 2004).*

(Continued)

*Primary Examiner* — Kavita Padmanabhan
*Assistant Examiner* — Darrin Dunn
(74) *Attorney, Agent, or Firm* — Kenyon & Kenyon LLP (57) ABSTRACT

Embodiments of the present invention provide improved accuracy of displacement control by using a multi-segment transformation of an actuator's non-linear response. The present invention may set intermediate points to effectively divide the actuator response into multiple segments. Each segment may be assigned a transform function that represents the actuator's response in that particular segment. The present invention may operate in two modes, a calibration mode and a normal operations mode. During calibration mode, the intermediate points and the segment transforms may be set. During normal operations mode, a drive signal may be generated according to the calibrated set values.

17 Claims, 7 Drawing Sheets

U.S. PATENT DOCUMENTS

| | | | |
|---|---|---|---|
| 2005/0017884 A1* | 1/2005 | Tanizawa | 341/118 |
| 2005/0039453 A1 | 2/2005 | Silverbrook | |
| 2005/0234565 A1* | 10/2005 | Marks et al. | 700/61 |
| 2005/0254106 A9 | 11/2005 | Silverbrook et al. | |
| 2006/0186874 A1* | 8/2006 | Mackin et al. | 324/158.1 |
| 2007/0280609 A1* | 12/2007 | Ito | 385/94 |
| 2008/0221711 A1* | 9/2008 | Trainer | 700/54 |
| 2008/0221821 A1* | 9/2008 | Miller | 702/94 |
| 2008/0231141 A1* | 9/2008 | Mushika et al. | 310/309 |
| 2008/0238738 A1* | 10/2008 | Honda et al. | 341/118 |

OTHER PUBLICATIONS

PCT International Search Report and Written Opinion for PCT/US2010/045861 mailed on Oct. 19, 2010.

* cited by examiner

MULTI-SEGMENT LINEARIZATION OF MICRO-ACTUATOR TRANSFER FUNCTIONS

This application claims benefit of priority from United States provisional application "Multi-Segment Linearization of Micro-Actuator Transfer Functions," Ser. No. 61/236,713, filed Aug. 25, 2009. The disclosure of which is incorporated herein by reference in its entirety.

This disclosure is related to U.S. patent provisional application Ser. No. 61/236,691, filed Aug. 25, 2009, which is assigned to Analog Devices, Inc., the assignee of the present disclosure. The 61/236,691 application is incorporated into the present disclosure in its entirety.

BACKGROUND

The present invention relates to actuator control for motor driven systems. In particular, it relates to improving performance and accuracy of the actuators.

Motor driven translational systems are used in a variety of electronic devices today. They are used to move mechanical systems under electrical control such as auto-focus systems or optical image stabilization systems in digital cameras, video recorders, mobile phones, personal digital assistants, and other electronic devices. In such systems, a motor driver integrated circuit generates a drive signal to an actuator which, in turn, drives a mechanical system (e.g., a lens assembly, in the case of an auto-focus system). The motor driver generates the drive signal in response to an input that indicates the desired displacement. Integrated circuit chips are widely used to control or drive a variety of actuators such as voice coil (VCM) actuators, shape memory alloy (SMA) actuators, and MicroElectroMechanical System (MEMS) actuators.

Figure 1:
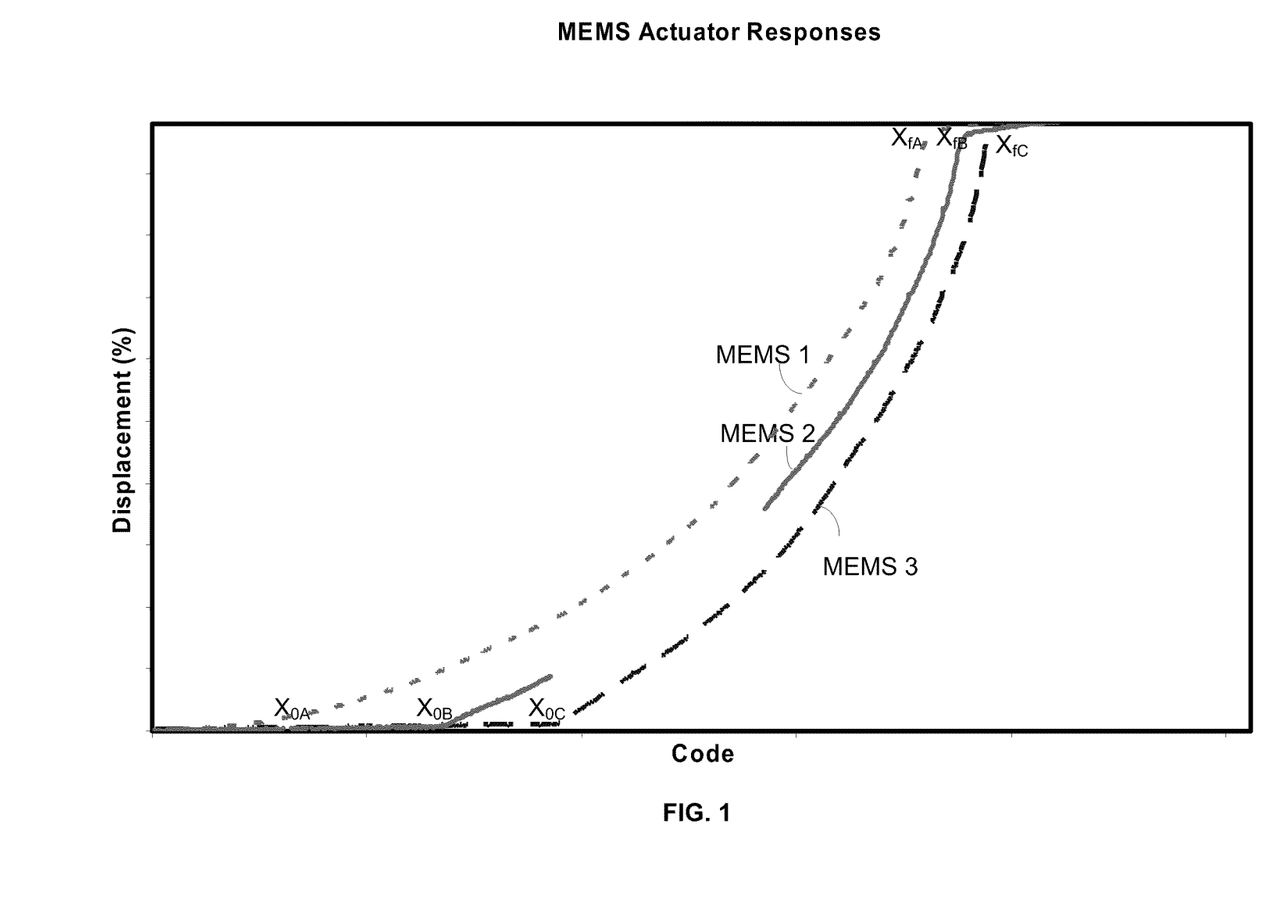
FIG. 1 illustrates example MEMS actuator responses.

Many actuators show a non-linear relation between the amount of voltage applied and the amount of displacement produced. The non-linear response leads to inaccurate performance of open loop motor driven systems. Actuator responses also can vary among manufacturing lots of the same actuator design. Furthermore, operational factors such as temperature and physical orientation with gravitational force have a substantial effect on the actuator responses. FIG. 1 shows example responses of a MEMS actuator in three different orientations. Each plot includes an offset voltage (shown as $X_0$), which is the minimum voltage required to effectuate displacement. Each plot also includes a maximum displacement voltage (shown as $X_f$); voltages beyond the maximum displacement voltage cause no further relevant mechanical displacement. It is common to obtain significantly different non-linear responses from different actuator devices.

Actuator response variances lead to poor performance thus inefficient actuator systems especially in open loop control situations. Therefore, there is a need in the art that can transform the undesired non-linear responses into accurate linear transform functions usable by the actuator system.

DETAILED DESCRIPTION

Embodiments of the present invention provide a control system that may include a plurality of code registers, each code register storing input and output code values for predetermined points of an actuator response, wherein the predetermined points divide the actuator response into multiple segments. The control system may also include a transform block to store transform functions for the multiple segments, and an accumulator, coupled to the code registers and the transform block, to generate an output control signal.

Embodiments of the present invention also provide a method comprising setting a code value for a minimum displacement voltage point of an actuator response; setting a code value for a maximum displacement voltage point of the actuator response; setting a code value for at least one intermediate point between the minimum displacement voltage point and the maximum displacement voltage point, wherein the at least one intermediate point divide the actuator response into multiple segments; assigning a transform function for each segment; and storing code values and transform function assignments.

Embodiments of the present invention further provide a method comprising receiving an input request to move a mechanical system; converting the input request into an input code; comparing the input code to segment endpoints of an actuator response, wherein each segment of the actuator response has an assigned transform function; based on the comparison, determining a segment in which the input code fits; applying the determined segment's assigned transform function to the input code; and generating an output signal from the applied transform function code.

Figure 2:
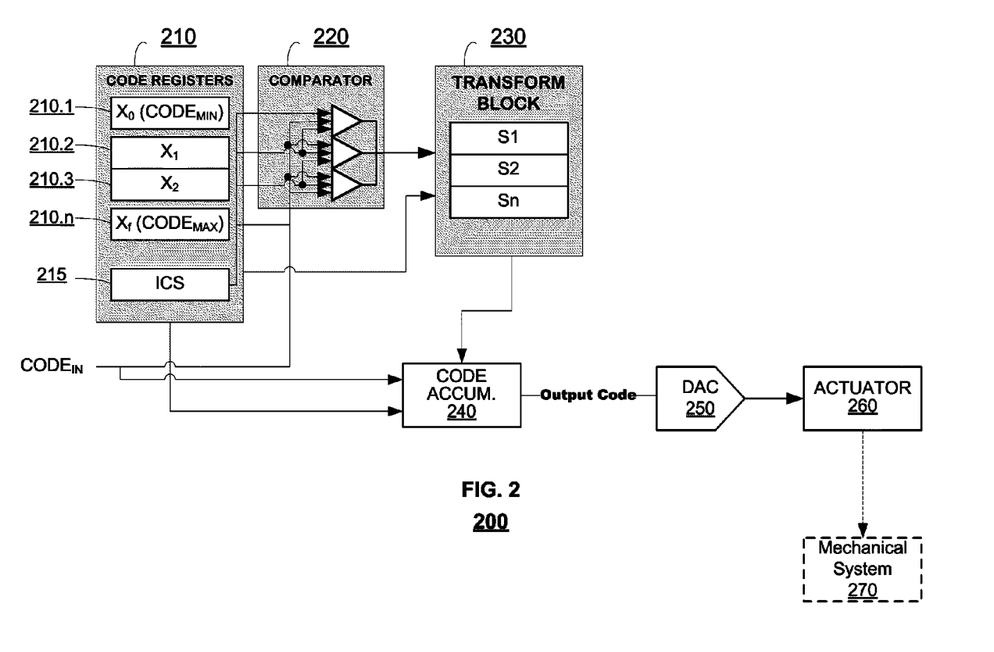
FIG. 2 illustrates an actuator control system according to an embodiment of the present invention.

FIG. 2 is a block diagram of an actuator control system 200 according to an embodiment of the present invention. The control system 200 may provide improved accuracy of displacement control by using multi-segment transformation of an actuator's non-linear response. The control system 200 may include one or more code registers 210, a comparator block 220, a transform block 230, a code accumulator 240, and a digital-to-analog converter (DAC) 250. The DAC 250 may be coupled to an actuator 260, which, in turn, may be coupled to a mechanical system 270.

Figure 3:
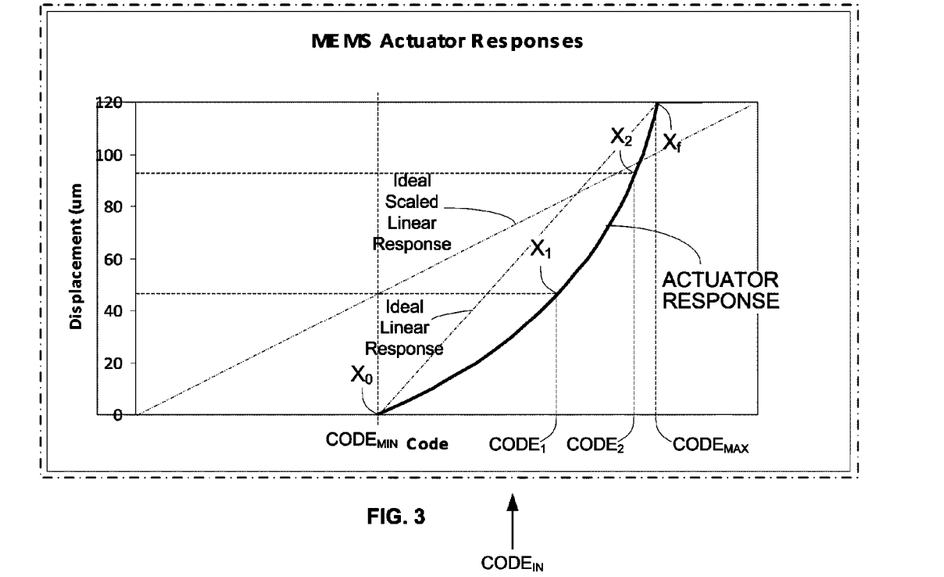
FIG. 3 illustrates a MEMS actuator response.

The code registers 210 (shown individually as registers 210.1-210.n and ICS registers 215) may store input and output code values for certain points of the actuator's response. For example, the $X_0$ register 210.1 may store a code value corresponding to point $X_0$, which is the offset voltage required to effectuate a minimum displacement from rest. Similarly, the $X_f$ register 210.n may store a code value corresponding to point $X_f$, which is the maximum displacement of the actuator. Other registers 210.2, 210.3, etc., may store code value(s) of intermediate point(s) along the actuator's response. For example, FIG. 3 shows an example actuator non-linear response with two intermediate points $X_1$ and $X_2$ marked. The intermediate points $X_1$, $X_2$ divide the response curve into 3 segments: $X_0$ to $X_1$, $X_1$ to $X_2$, and $X_2$ to $X_f$. FIG. 3 also illustrates an exemplary ideal linear response from $X_0$ to $X_f$ and an exemplary ideal scaled linear response that exploits the full DAC range. Input Code Segmentation (ICS) registers 215 may store corresponding input code segmentation. For example, if the input code segmentation is set uniformly, for 2 segments and a 10-bit DAC, the additional ICS registers 215 would store the end point of each segment (i.e., 512 and 1023).

Code register values may be pre-programmed from prior knowledge of the displacement at the selected points. Alternatively, the values may be obtained from derived characteristics of the actuators.

Returning to FIG. 2, comparator block 220 may include a plurality of comparators. Each comparator may have one input coupled to the input ($CODE_{IN}$) for receiving an input code value. The comparators may have segment inputs coupled to respective register pairs. For example, the segment inputs may be coupled to two code registers from the plurality of additional ICS code registers 215 correlating to a particular segment's endpoints. During operation, if an input code $CODE_{IN}$ is supplied that falls between code values stored in the code registers, one of the comparators will identify the range of the $CODE_{IN}$.

The comparator block 220 may be coupled to the transform block 230. The transform block 230 may store different transform functions that may be pre-stored in the transform block 230. The relevant coefficients of the transform functions may be applied according to an assigned segment. Each transform function may be a linear transformation function, a square root transformation function, a quadratic linear function, or any suitable transformation function.

The transform block 230 may be coupled to the code accumulator 240. The code accumulator 240 may receive the actuator control system 200 input $CODE_{IN}$. The code accumulator 240 may also be coupled to the code registers 210 and transform block 230. The code accumulator may generate an Output Code based on $CODE_{IN}$ and inputs from the transform block 230. The DAC 250 may convert the digital Output Code into an analog output signal and apply the output signal to actuator 260. The actuator 260, responsive to the output signal, may effectuate displacement in mechanical system 270.

Control system 200 may provide improved accuracy of displacement control because of its multi-segment transformation approach. As shown in FIG. 3, the actuator response may be non-linear and non-uniform thereby resulting in inaccurate displacement control. The control system 200 may divide the actuator response into multiple segments and assign a transform function that best mimics or represents each segment. For example, the segment from $X_0$ to $X_1$ may have a different transform function assigned to it than the segment from $X_1$ to $X_2$. Alternatively, the two segments may have the same transform function but different coefficients that better match each particular segment. The transform functions of each segment may combine into a piecewise transformation of the entire actuator response that linearizes the actuator response. Control system 200 may ensure the use of the full code range of the coupled DAC and, therefore, may result in more precision as compared to conventional actuator control systems.

Figure 4:
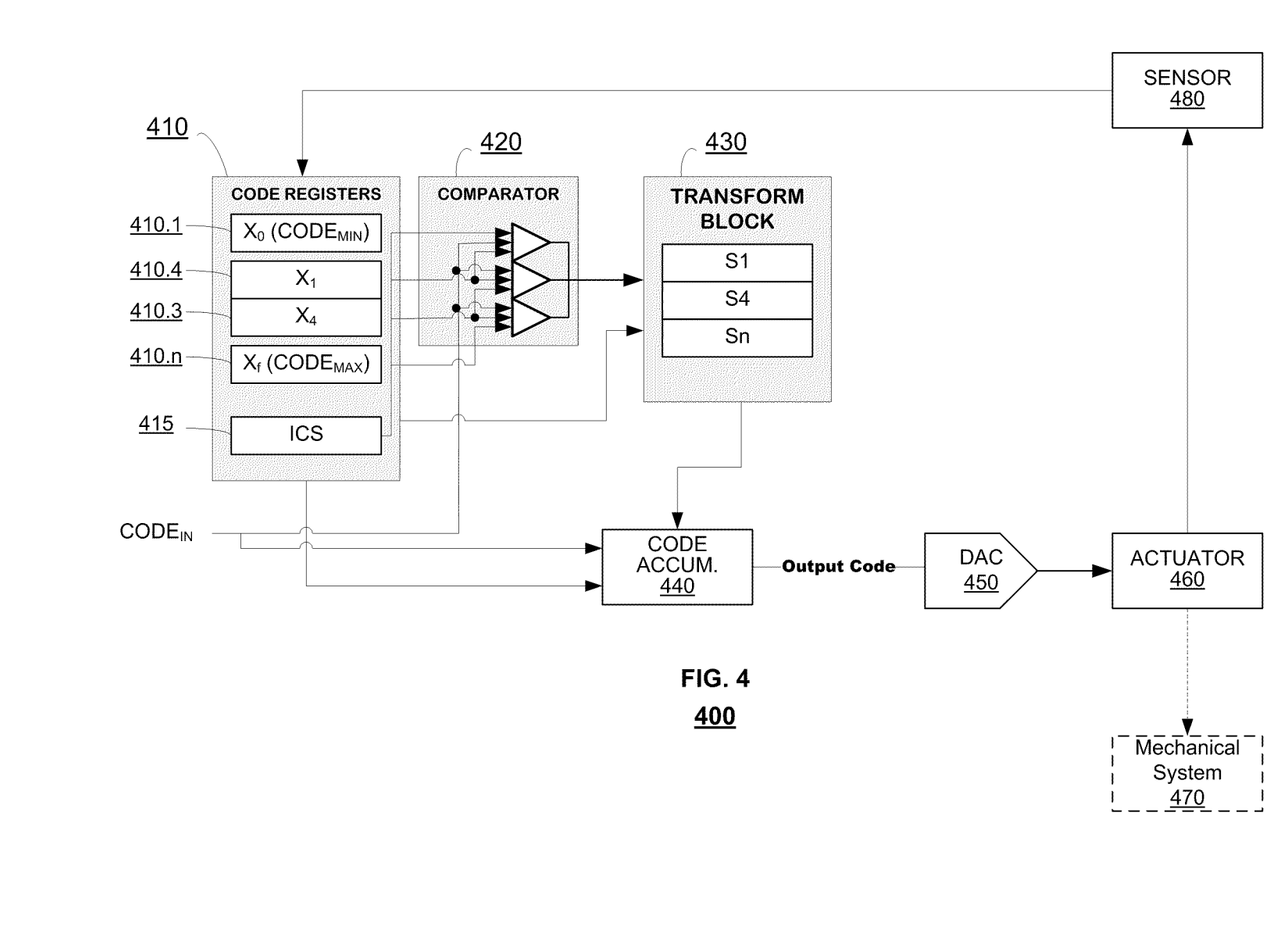
FIG. 4 illustrates an actuator control system according to an embodiment of the present invention.

FIG. 4 is a block diagram of an actuator control system 400 according to an embodiment of the present invention. The control system 400 while providing improved accuracy of displacement control by using multi-segment transformation of an actuator's non-linear response also may dynamically capture the actuator's response.

The control system 400 may include one or more code registers 410, a comparator block 420, a transform block 430, a code accumulator 440, and a digital-to-analog converter (DAC) 450. The DAC 450 may be coupled to an actuator 460, which, in turn, may be coupled to a mechanical system 470. Actuator control system 400 may also include a sensor 480 coupled to the actuator 460 and code registers 410.

Code registers 410 (shown individually as registers 410.1-410.$n$ and ICS registers 415) may store input and output code values for certain points of the actuator's response via the sensor 480. The sensor 480 may measure displacement values for each input code register value from the actuator 470 and transmit the measured values to the code registers 410 to be stored. Code accumulator 440 may generate test signals at specific code register values in order for the sensor 480 to measure the corresponding displacement values.

The sensor 480 may measure the displacement directly or indirectly (e.g. capacitive). The sensor 480 may be a capacitive measurement system as disclosed in co-pending and commonly assigned U.S. patent provisional application Ser. No. 61/236,691 filed Aug. 25, 2009 and entitled "Automatic Characterization of an Actuator based on Capacitance Measurement." The 60/236,691 application is incorporated into the present disclosure in its entirety.

Alternatively, the sensor 480 may be a Hall effect sensor, a resistive sensor, an inductive sensor, a photoelectric sensor, or other suitable sensor. The sensor 480 may include a temperature sensor. The sensor 480 may also include an orientation sensor such as an inclinometer, a gyroscope, or any suitable position detection device to detect the mechanical system's orientation.

Comparator block 420 may include a plurality of comparators. Each comparator may have one input coupled to the input ($CODE_{IN}$) for receiving an input code value. The comparators may have segment inputs coupled to respective register pairs. For example, the segment inputs may be coupled to two code registers from the plurality of additional ICS code registers 415 correlating to a particular segment's endpoints. During operation, if an input code $CODE_{IN}$ is supplied that falls between code values stored in the code registers, one of the comparators will identify the range of the $CODE_{IN}$.

The comparator block 420 may be coupled to the transform block 430. The transform block 430 may store different transform functions that may be pre-stored in the transform block 430. The relevant coefficients of the transform functions may be applied according to an assigned segment. Each transform function may be a linear transformation function, a square root transformation function, a quadratic linear function, or any suitable transformation function.

The transform block 430 may be coupled to the accumulator 440 that store code expansion functions. The code accumulator 440 may receive the actuator control system 400 input $CODE_{IN}$. The code accumulator 440 may be coupled to the code registers 410 and transform block 430. The code accumulator may generate and Output Code based on $CODE_{IN}$ and inputs from the transform block 430. The DAC 450 may convert the digital Output Code into an analog output signal and apply the output signal to actuator 460. The actuator 460, responsive to the output signal, may effectuate displacement in mechanical system 470.

Embodiments of actuator control systems of the present invention may operate in two modes, a calibration mode and a normal operation mode. The calibration mode may be triggered by an initial start-up, a change in orientation, or any predetermined event. In the calibration mode, the actuator control system may procure value settings that are to be used in the normal operations mode.

Figure 5:
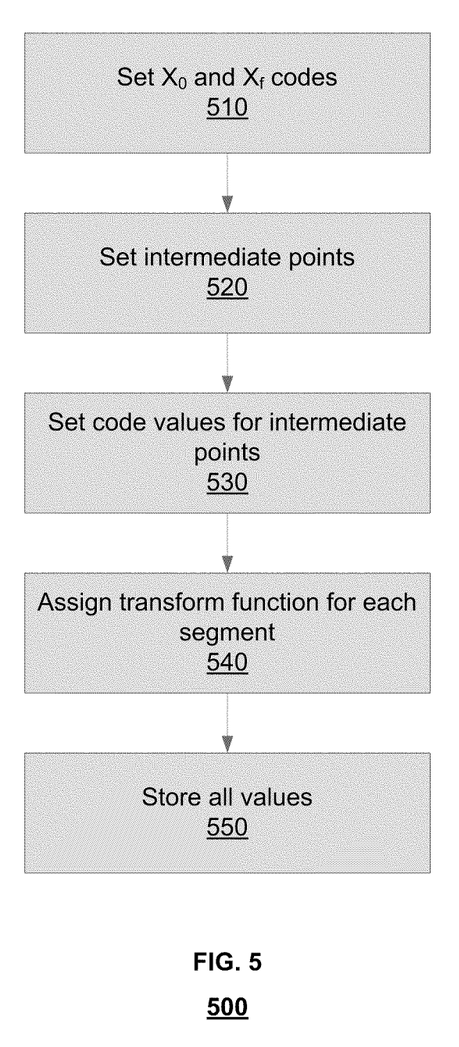
FIG. 5 is a simplified process flow for an actuator control system operation according to an embodiment of the present invention.

FIG. 5 illustrates a calibration method 500 according to an embodiment of the present invention. The calibration method 500 may begin with setting the code values for points $X_0$ and $X_f$ according to their displacement values (block 510). $X_0$ correlates to the offset voltage required to effectuate displacement, and $X_f$ correlates to the maximum displacement voltage point. The displacement values may be pre-set based on prior knowledge of the system. Alternatively, the displacement values may be measured by the actuator control system via a sensor in response to test signals applied to the actuator. The displacement values may then be converted into code values and stored in the registers.

The method 500 may set the locations for the intermediate points that will divide the non-linear response into multiple segments (block 520). The intermediate points may be predetermined or may be set dynamically with all the available information including the already measured values. The number of intermediate points may also be predetermined or may be set dynamically. Once the intermediate points are set, the code values corresponding to the set intermediate points may be set (block 530). The code values represent the displacement produced at the intermediate values. The code values may be set according to prior knowledge of the displacement at the set intermediate points. Alternatively, the displacement values may be measured by the actuator control system via a sensor in response to test signals applied to the actuator, where the test signals correspond to the intermediate values. The displacement values may then be converted into code values and stored in the registers.

Next, the method 500 may assign a transform function for each segment created by the intermediate points (block 540). The assigned transform function may represent or characterize the actuator's response in the particular segment. The transform function may be a linear transformation function, a square root transformation function, a quadratic function, or any suitable transformation function. The method 500 may then store all values that are to be used in normal operations mode and exit calibration mode (block 550).

At the end of the calibration mode, each segment may have an assigned transform function related to the segment's endpoints. The Output Code for each segment may be generalized by the following equation:

$$\text{Output\_Code} = \text{Low} + f\left(\left(\frac{\text{High} - \text{Low}}{\text{Max}}\right) \cdot \text{code}\right),$$

where f( ) represents the transform function of the segment, High represents output code value for the high endpoint of the segment, and Low represents the output code value for the low endpoint of the segment, Max represents the width of the input code segmentation registers (ICS), and code represents the input code variable.

Assignment of transform function and segment code range may depend on the number of intermediate points chosen. As an example, a 2 segment transformation method may be based on a single intermediate point, $X_1$ corresponding to half the maximum displacement. Under this condition, the 2 segment piecewise linearization equations for a 10 bit DAC may be represented by S1 and S2, which are general continuous linear transformations with the corresponding general expression:

Output_code=$X_0$+$(X_1-X_0)$·2·code/1023, where
0≦code<512     S1

Output_code=$X_f$+$(X_f-X_1)$·2·(1023−code)/1023, where
512≦code≦1023     S2

Output_code represents the accumulator output that is to be delivered to the actuator via the DAC. $X_0$ represents the offset voltage point required to effectuate displacement. $X_f$ represents the maximum displacement voltage point. $X_1$ represents the voltage point of the intermediate value. Code represents the variable for the input of the system.

It should be noted that these equations are for a 10 bit DAC; however, the present invention may be used with DAC of other bit sizes. Also, in this example, both segments are assigned a linear transform function; however, each segment may be assigned non-linear transform functions if desired. A possible embodiment may include simplifications such as approximating the maximum output code to the nearest power of two, which results in simpler implementation but may introduce a marginal error.

Figure 6:
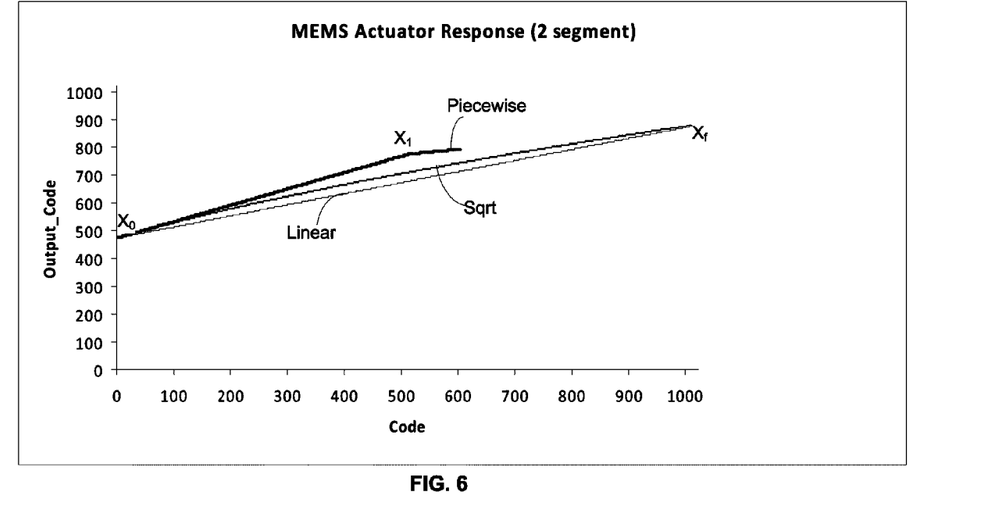
FIG. 6 illustrates output code transformations for a MEMS non-linear actuator.

A segmented transform response provides a more accurate representation than a unitary transform response. FIG. 6 illustrates three different output code transformations: a 2 segment piecewise linear transform response, a unitary linear transform response, and a unitary square root transform response. As can be seen, the piecewise response of only 2 segments shows the variances between different parts of the actuator response. The piecewise response illustrates that the actuator response has a first slope in the first segment, S1 (between points $X_0$ and $X_1$), and a second slope in the second segment, S2 (between points $X_1$ and $X_f$).

Figure 7:
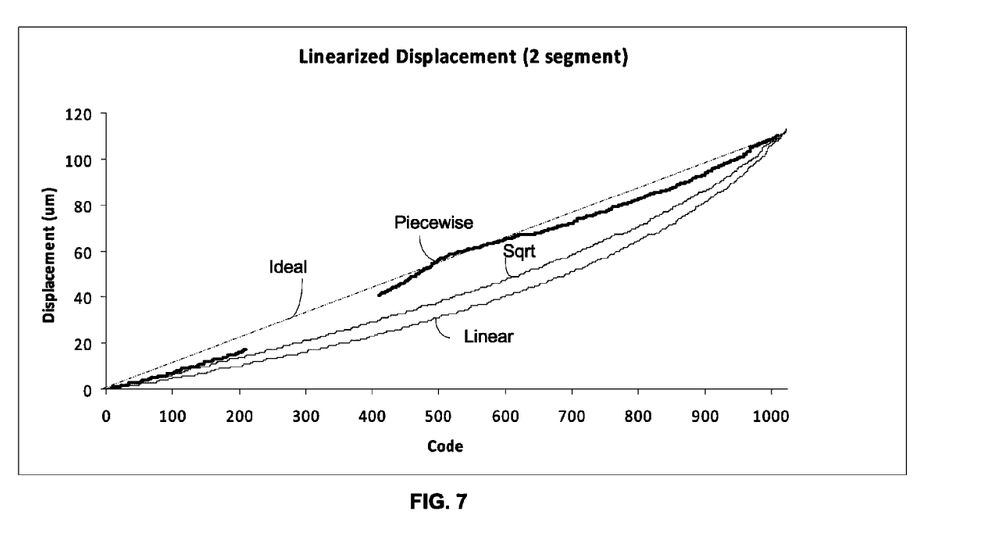
FIG. 7 illustrates the displacement caused by a MEMS actuator linearized response.

FIG. 7 illustrates the responses after applying the output code transform shown in FIG. 6 responses, resulting linearized displacement along with an ideal linearized displacement response. As can be seen, the 2 segment piecewise response is superior to the two unitary responses in linearizing the displacement response.

The accuracy of the piecewise transformation to mimic the actuator non-linear response increases with the number of segments chosen. For example, a piecewise response of 4 segments may produce a more accurate response than a piecewise response with 2 segments. However, a 4 segment piecewise response may be more complex, may take more time in the calibration mode, and use more resources compared to a 2 segment piecewise response. For example, if the system measures the values for the intermediate points, measuring 3 intermediate point values for a 4 segment piecewise response takes a longer amount of time and uses more resources than measuring 1 intermediate point value for a 2 segment piecewise response.

For illustration purposes, described herein is the process to obtain the linearization of a 4 segment piecewise response when the displacement of the actuator is measured indirectly by measuring the capacitance between the moving surface and a set reference. The 4 segment piecewise transformation response may have the following linearization equations for a 10 bit DAC:

$$s1: \text{Output\_code} = \text{code} \cdot \frac{X_1 - X_0}{W_1} + X_0$$

with $0 \leq \text{code} \leq W_1$ $$s2: \text{Output\_code} = (\text{code} - W_1) \cdot \frac{X_2 - X_1}{W_2} + X_1$$

with $W_1 \leq \text{code} \leq W_1 + W_2$

-continued $$s3:\ \text{Output\_code} = (\text{code} - W_1 - W_2) \cdot \frac{X_3 - X_2}{W_3} + X_2$$

with $W_1 + W_2 \leq \text{code} \leq W_1 + W_2 + W_3$ $$s4:\ \text{Output\_code} = (\text{code} - W_1 - W_2 - W_3) \cdot \frac{X_f - X_3}{W_4} + X_3$$

with $W_1 + W_2 + W_3 \leq \text{code} \leq 1023$

Where $W_1 = \frac{C_1 - C_0}{C_f - C_0} \cdot 1023$  $W_2 = \frac{C_2 - C_1}{C_f - C_0} \cdot 1023$ $W_3 = \frac{C_3 - C_2}{C_f - C_0} \cdot 1023$  $W_4 = \frac{C_f - C_3}{C_f - C_0} \cdot 1023$ Output_Code represents the output that is to be delivered to the actuator via the DAC. $X_0$ represents the offset voltage point required to effectuate displacement. $X_f$ represents the maximum displacement voltage point. $X_1$, $X_2$, $X_3$ represent the voltage points of the intermediate values. $C_x$ represent the capacitance value of each point, which is related to displacement. $W_i$ represent the width of each segment; i.e. the number of input codes each segment has. Code represents the variable for the input of the system.

It should be noted that these equations are for a 10 bit DAC; however, the present invention may be used with DAC of other bit sizes. Also, in this example, both segments are assigned a linear transform function; however, each segment may be assigned non-linear transform functions if desired. The accuracy of the results may directly correlate to the intermediate points approximating equal actuator displacement.

Figure 8:
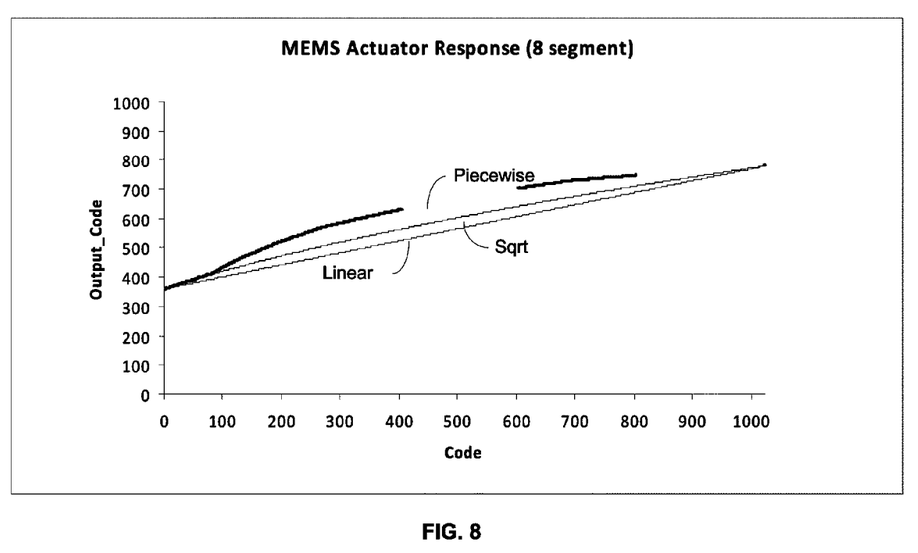
FIG. 8 illustrates output code transformations for a MEMS non-linear actuator.

The transformation process may be extended to any number of intermediate points. As an example, FIG. 8 illustrates three different kinds of actuator code transformations: an 8 segment piecewise linear transform response, a unitary linear transform response, and a unitary square root transform response. As can be seen, the 8 segment piecewise response shows the variances between different parts of the actuator response as opposed to the unitary square root and unitary linear transform responses.

Figure 9:
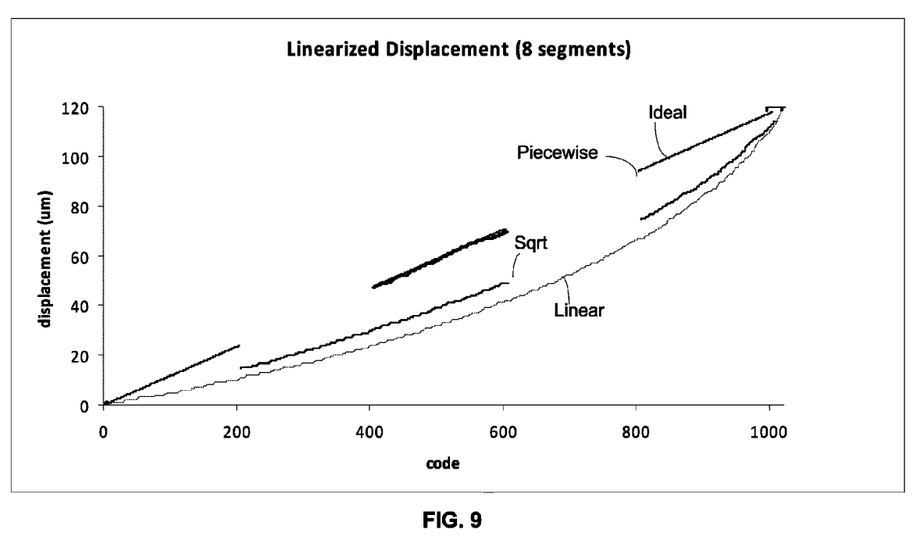
FIG. 9 illustrates the displacement caused by a MEMS actuator linearized response.

FIG. 9 illustrates the responses after applying the output code transforms in FIG. 8, resulting linearized displacement along with an ideal linearized displacement response. As can be seen, the 8 segment piecewise response is superior to the two unitary responses in linearizing the displacement response. Also, FIG. 9 shows the higher accuracy of the 8 segment piecewise response as compared to the 2 segment piecewise response shown in FIG. 7.

Figure 10:
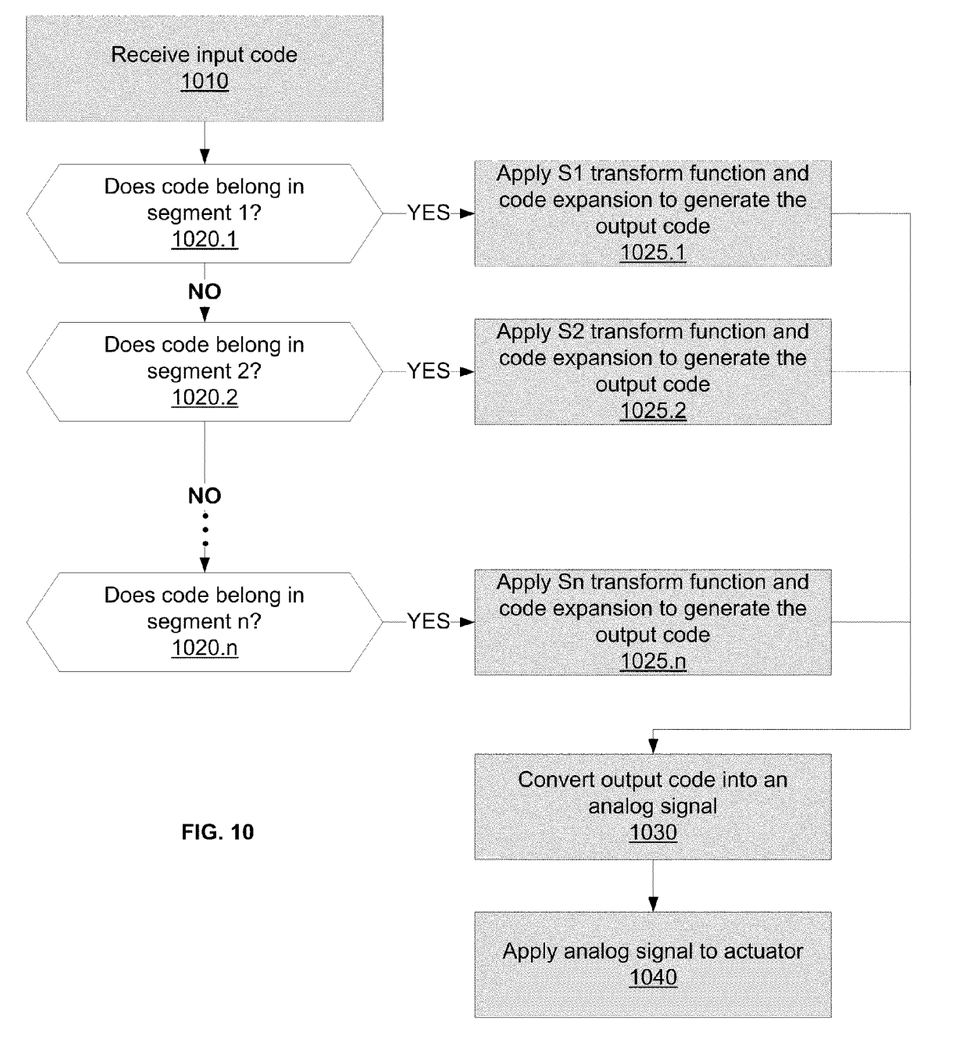
FIG. 10 is a simplified process flow for an actuator control system operation according to an embodiment of the present invention.

FIG. 10 illustrates a normal operation method 1000 according to an embodiment of the present invention. The method 1000 may begin with receiving an input (block 1010). The input may be from a user, in response to a user interaction or as a result of a process such as autofocus. The input may be a request to move a coupled mechanical system by the actuator. The input may be converted into an input code.

The method 1000 may then compare the input code to stored values to determine which segment the input code belongs in and may assign the determined segment transform function to the code. For example, the method 1000 may first compare the input code to the endpoints of segment 1 (block 1020.1). If the input code is within the endpoints of segment 1, the transform function and code expansion of segment 1 may be applied to the input code to generate the output code (block 1025.1). If the input code is not within the endpoints of segment 1, the method 1000 may compare the input code to the endpoints of segment 2 (block 1020.2). If the input code is within the endpoints of segment 2, the transform function and code expansion of segment 2 may be applied to the input code to generate the output code (block 1025.2). The method 1000 may continue until the input code is compared to the endpoints of segment n (block 1020.n and block 1025.n).

After generating an output code, the method 1000 may then convert the output code into an analog signal (block 1030). The analog signal may be applied to the actuator, which may effectuate a displacement in the coupled mechanical system (block 1040).

Several embodiments of the present invention are specifically illustrated and described herein using an example of MEMS actuator system. However, it should be understood that the MEMS actuator system example is used for narrative simplicity only and that the present invention applies equally well for other motor driver systems such as VCM, piezoelectric, and SMA systems.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disc Read Only Memory (CD-ROM), Compact Disc Recordable (CD-R), Compact Disc Rewriteable (CD-RW), optical disk, magnetic media, magneto-optical media, removable memory cards or disks, various types of Digital Versatile Disc (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

We claim:

1. An open-loop control system, comprising:
a plurality of code registers to store input code values for predetermined points of an actuator response, wherein the predetermined points divide the actuator response into multiple segments;
a transform block to store transform functions with respective coefficients assigned to the multiple segments; and
an accumulator, coupled to the code registers and the transform block, to generate an output control signal in the open-loop control system based on matching an input request to a segment of the actuator response and using the assigned transform function's respective coefficient for the matched segment.

2. The control system of claim 1, further comprising a sensor coupled to the code registers and actuator.

3. The control system of claim 2, wherein the sensor is a resistive, capacitive, inductive, or photoelectric measurement system.

4. The control system of claim 2, wherein the sensor is a direct measurement system.

5. The control system of claim 2, wherein the sensor includes a temperature sensor.

6. The control system of claim 2, wherein the sensor includes an orientation sensor.

7. The control system of claim 1, further comprising a comparator block coupled to the code registers.

8. The control system of claim 7, wherein the comparator block includes a plurality of comparators, each comparator having one input coupled to an accumulator input and at least another input coupled to one of the plurality of code registers.

9. The control system of claim 1, further comprising a digital to analog converter coupled to the accumulator.

10. A method, comprising:
setting a code value for a minimum displacement voltage point of an actuator response;
setting a code value for a maximum displacement voltage point of the actuator response;
setting a code value for at least one intermediate point between the minimum displacement voltage point and the maximum displacement voltage point, wherein the at least one intermediate point divide the actuator response into multiple segments;
assigning a transform function with at least one respective coefficient for each segment;
storing code values and transform function assignments; and
operating the actuator in an open-loop control system using the stored code values by matching an input request to a segment of the actuator response and generating an output drive signal using the assigned transform function's respective coefficient for the matched segment.

11. The method of claim 10, wherein setting the code values comprises measuring the actuator displacement.

12. The method of claim 11, wherein measuring comprises measuring the capacitance between a moving surface and a set reference.

13. The method of claim 10, wherein the transform function is a linear transform function.

14. The method of claim 10, wherein the transform function is a square root transform function.

15. A method comprising:
receiving an input request to move a mechanical system;
converting the input request into an input code;
comparing the input code to segment endpoints of an actuator response, wherein each segment of the actuator response has an assigned transform function with at least one respective coefficient;
based on the comparison, determining a segment in which the input code fits;
applying the determined segment's assigned transform function using the transform's respective coefficient to the input code; and
generating an output signal from the applied transform function code.

16. The method of claim 15, wherein the transform function is a linear transform function.

17. The method of claim 15, wherein the transform function is a quadratic function.

* * * * *